United States Patent
Payton

(10) Patent No.: US 7,454,055 B1
(45) Date of Patent: Nov. 18, 2008

(54) ENHANCED IMAGE COMPRESSION UTILIZING HILBERT CURVE SCANNING OF QUANTIZED DISCRETE COSINE TRANSFORM COEFFICIENTS

(76) Inventor: Paul M. Payton, 743 El Camino Real, Apt. 35, Burlingame, CA (US) 94010

( * ) Notice: Subject to any disclaimer, the term of this patent is extended or adjusted under 35 U.S.C. 154(b) by 581 days.

(21) Appl. No.: 10/985,998

(22) Filed: Nov. 12, 2004

(51) Int. Cl.
*G06K 9/00* (2006.01)

(52) U.S. Cl. .................. 382/166; 382/162; 382/232; 382/233

(58) Field of Classification Search ............... 382/232, 382/233, 133, 166, 162, 128, 129; 250/208.1, 250/235; 348/E3.018, E3.051; 341/87, 67; 706/16, 17
See application file for complete search history.

(56) References Cited

U.S. PATENT DOCUMENTS

| | | | | |
|---|---|---|---|---|
| 6,054,943 | A * | 4/2000 | Lawrence | 341/87 |
| 6,754,383 | B1 | 6/2004 | Payton | 382/166 |
| 7,271,374 | B2 * | 9/2007 | Maguire | 250/208.1 |

OTHER PUBLICATIONS

Olivier Egger, et al., "High-Performance Compression of Visual Information—A Tutorial Review; Part I: Still Pictures", Proceedings of the IEEE, Jun. 1999, pp. 976-1011, vol. 87, No. 6.
Siu Chun, "The JPEG Premier: A Review on JPEG Lossy Compression Method", Paper Review Projecte fo rIEG 5124 Signal Processing Application, Department of Information Engineering, The Chinese University of Hong Kong, undated, 7 pages.
European Search Report dated Mar. 18, 2005, in EP 01850124.7.
"Three-Dimensional Transform Coding Of Multispectral Data", by John A. Saghri, et al., 1993 IEEE, pp. 1342-1346.
"Terrain-Adaptive Transform Coding Of Multispectral Data", by John A. Saghri, et al., 1994 IEEE, pp. 313-316.
"Coding Of Spectrally Homogenous Regions In Multispectral Image Compression", by Gabriel Fernandez, et al., 1996 IEEE, pp. 923-926.
"An Efficient Adaptive KLT For Multispectral Image Compression", by Lena Chang, et al., 2000 IEEE, pp. 252-255.

\* cited by examiner

*Primary Examiner*—Anh Hong Do

(57) ABSTRACT

A method for compressing images, the method including the steps of partitioning image information for an image into partitioned information, transforming the partitioned information into transformed information using a discrete cosine transform ("DCT"), and quantizing the transformed information into quantized information. The method further includes the steps of sequencing the quantized information into sequenced information using a Hilbert curve scan, encoding the sequenced information into encoded information, and storing the encoded information. The DCT is a JPEG DCT.

14 Claims, 10 Drawing Sheets

```
977   -8    -67   30    -45   -84   -70   138
22    -44   48    -1    165   0     -58   5
97    -119  76    56    -1    -27   -41   -48
9     132   -71   -32   -90   -10   -199  -12
-34   11    -46   26    -20   -58   -40   -87
-34   -17   -96   -54   -66   53    1     -28
128   -102  -53   -22   -24   119   -77   2
36    -25   12    -70   -211  35    95    -115
```

```
977 -8 22 97 -44 -67 30 48 -119 9 -34 132 76 -1 -45 -84 165 56 -71 11 -34 128 -17 -46 -32 -1 0 -70 138 -58 -27 -90 26 -96 -102 36 -25 -53 -54 -20 -10 -41 5 -48 -199 -58 -66 -22 12 -70 -24 53 -40 -12 -87 1 119 -211 35 -77 -28 2 95 -115
```

```
977 22 -44 -8 -67 30 -1 48 76 56 -32 -71 132 -119 97 9 -34 11 -17 -34 128 36 -25 -102 -53 12 -70 -22 -54 -96 -46 26 -20 -58 53 -66 -24 -211 35 119 -77 95 -115 2 -28 1 -40 -87 -12 -48 -41 -199 -10 -90 -1 -27 0 165 -45 -84 -70 -58 5 138
```

ENHANCED IMAGE COMPRESSION UTILIZING HILBERT CURVE SCANNING OF QUANTIZED DISCRETE COSINE TRANSFORM COEFFICIENTS

STATEMENT AS TO RIGHTS TO INVENTIONS MADE UNDER FEDERALLY SPONSORED RESEARCH OR DEVELOPMENT

Not Applicable.

FIELD OF INVENTION

The present invention relates to enhanced image compression and reconstruction and, more particularly, relates to the compression and reconstruction of images using Hilbert curve scanning of discrete cosine transformation coefficients.

BACKGROUND OF THE INVENTION

Short for "discrete cosine transform," a DCT is a technique for representing waveform data as a weighted sum of cosines, and is commonly used for image compression. Closely related to the discrete Fourier transform ("DFT"), discrete cosine transformations involve manipulation of real numbers only, offering energy compaction improvements over DFT by eliminating artificial discontinuities that appear in DFT.

Attributed to these and other appealing qualities, the DCT is popularly deployed in a broad class of coding techniques, known as transform coding or block quantization, which attempt to reduce image signal redundancy by representing signals with a new set of orthogonal bases, reducing the spatial correlations that occur between adjacent pixels. Using direct cosine transformations, a fraction of the transform coefficients is encoded, with tolerable deterioration in image fidelity.

JPEG (pronounced "jay-peg") is one standardized DCT-based image compression mechanism for still images. An acronym for "Joint Photographic Experts Group" (the original name of the committee that wrote the standard), JPEG is designed to compress either full-color or gray-scale images of natural, real-world scenes. Conventional JPEG typically works well on photographs, naturalistic artwork, and similar material, but is not as effective on lettering, simple cartoons, or line drawings. In addition to conventional JPEG, other DCT-based image compression mechanisms are well known in the data compression art.

FIG. 1 is a block diagram illustrating the baseline algorithm or encoding process utilized by the conventional JPEG coding standard. The processes and functionalities associated with each step of the conventional JPEG image compression algorithm, including the image data input step (Step S102), the image partitioning step (Step S104), the forward DCT step (Step S105), the quantization step (Step S106), the zigzag re-sequencing step (Step S107), the entropy encoding step (Step S109), and the compressed data output step (Step S110) are well known in the art, and for this reason these steps are largely not described herein, for the sake of brevity.

FIGS. 2A to 2C illustrate one problem associated with the conventional JPEG image compression mechanism. FIG. 2A depicts an example of an 8×8 vector of normalized quantized coefficients that would typically be output by the quantization step (Step S106), for an 8×8 random image patch. As depicted in FIG. 2B, the zigzag reordering step (Step S107) attempts to group low-frequency coefficients at the top of a vector, mapping the 8×8 vector to a 1×64 vector, by zigzagging through the coefficients as shown. The resulting 1×64 vector, illustrated in FIG. 2C, is used in the entropy encoding process (Step S109) to further compress the quantized image data.

While attempting to group coefficients of like magnitude, the trellis-coding approach used by conventional JPEG, which zigzags back and fourth between quantized DCT coefficients, does not necessarily preserve coefficient adjacency, and the zigzag path often introduces jump discontinuities. For these and other reasons, zigzag re-sequencing of quantized DCT coefficients according to the conventional JPEG image compression mechanism typically results in an increased loss of coefficient magnitudes, decreasing overall compression efficiency.

It is therefore considered highly desirable to provide an enhanced DCT-based image compression mechanism which increases compression efficiency. In particular, it is desirable to provide an image compression mechanism which orders DCT coefficients in a manner which reduces jump discontinuities, and preserves coefficient adjacency, resulting in more efficient JPEG block coding.

SUMMARY OF THE INVENTION

The present invention relates to enhanced image compression and reconstruction and, more particularly, relates to the compression and reconstruction of images using Hilbert curve scanning of discrete cosine transformation coefficients.

Based on the foregoing discussion, it is appreciated that there presently exists a need in the art for a computer system and a corresponding operating method which overcomes the above-described deficiencies of the prior art. The present invention overcomes several key drawbacks and shortcomings of known data compression techniques, particularly with regard to the inefficient zigzag re-sequencing of quantized DCT coefficients by the conventional JPEG image compression mechanism.

It is a feature and advantage of the present invention to provide an image compression and reconstruction technique that improves the image quality of a reconstructed image, by reducing image quality degradation at high compression ratios. As such, the present invention optimizes utilization of file space, and reduces the transmission times required to transmit compressed images.

It is a further feature and advantage of the invention to compress an image, utilizing a re-sequencing technique which preserves coefficient adjacency and reduces jump discontinuities. The method, which is performed on a computer or other programmable data processing apparatus, is variant of the conventional JPEG image compression mechanism.

According to one aspect, the present invention is a method for compressing an image. The method includes the steps of partitioning image information for the image into partitioned information, transforming the partitioned information into transformed information using a discrete cosine transform, and quantizing the transformed information into quantized information. The method further includes the steps of sequencing the quantized information into sequenced information using a Hilbert curve scan, encoding the sequenced information into encoded information, and storing the encoded information. The discrete cosine transform is a JPEG DCT.

According to a second aspect, the present invention is a system for compressing an image, including a memory for storing information for an image, and a computer processor. The computer processor is for compressing the stored information, by performing the steps of partitioning the image information for the image into partitioned information, transforming the partitioned information into transformed information using a discrete cosine transform, and quantizing the transformed information into quantized information. The computer processor further performs the steps of sequencing the quantized information into sequenced information using a Hilbert curve scan, encoding the sequenced information into encoded information, and storing the encoded information.

According to a third aspect, the present invention is a computer-readable storage medium in which is stored a program for compressing an image. The program includes codes for permitting the computer to perform a partitioning step for partitioning image information for the image into partitioned information, a transforming step for transforming the partitioned information into transformed information using a discrete cosine transform, and a quantizing step for quantizing the transformed information into quantized information. The program further includes codes for permitting the computer to perform a sequencing step for sequencing the quantized information into sequenced information using a Hilbert curve scan, an encoding step for encoding the sequenced information into encoded information, and a storing step for storing the encoded information.

According to a fourth aspect, the present invention is a method for compressing and reconstructing an image. The method comprises the steps of partitioning image information for the image into partitioned information, transforming the partitioned information into transformed information using a discrete cosine transform, and quantizing the transformed information into quantized information. The method further comprises the steps of sequencing the quantized information into sequenced information using a Hilbert curve scan, encoding the sequenced information into encoded information, storing the encoded information, and reconstructing the encoded information.

According to a fifth aspect, the present invention is a method for reconstructing an image. The method includes the steps of decoding encoded information into sequenced information, and de-sequencing the sequenced information into quantized information using a Hilbert curve scan. The method further includes the steps of de-quantizing the quantized information into transformed information, de-transforming the transformed information into partitioned information using an inverse of a discrete cosine transform, and de-partitioning the partitioned information into image information.

According to a sixth aspect, the present invention is a system for reconstructing an image, including a memory for storing encoded information for the image, and a computer processor for reconstructing the stored encoded information. The computer processor performs the steps of decoding the encoded information into sequenced information, and means for de-sequencing the sequenced information into quantized information using a Hilbert curve scan. The system further includes means for de-quantizing the quantized information into transformed information means for de-transforming the transformed information into partitioned information using an inverse of a discrete cosine transform, and means for de-partitioning the partitioned information into image information.

According to a seventh aspect, the present invention is a computer-readable storage medium in which is stored a program for reconstructing an image. The program includes codes for permitting the computer to perform a decoding step for decoding encoded information for the image into sequenced information, and a de-sequencing step for de-sequencing the sequenced information into quantized information using a Hilbert curve scan. The program further includes codes for permitting the computer to perform a de-quantiza-tion step for de-quantizing the quantized information into transformed information, a de-transforming step for de-transforming the transformed information into partitioned information using an inverse of a discrete cosine transform, and a de-partitioning step for de-partitioning the partitioned information into image information.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout.

DETAILED DESCRIPTION OF THE INVENTION

The present invention provides an enhanced DCT-based image compression mechanism which increases compression efficiency. In particular, the present invention provides an image compression mechanism which reorders quantized DCT coefficients in a manner which reduces jump discontinuities and preserves coefficient adjacency, resulting in more efficient block coding.

Figure 3:
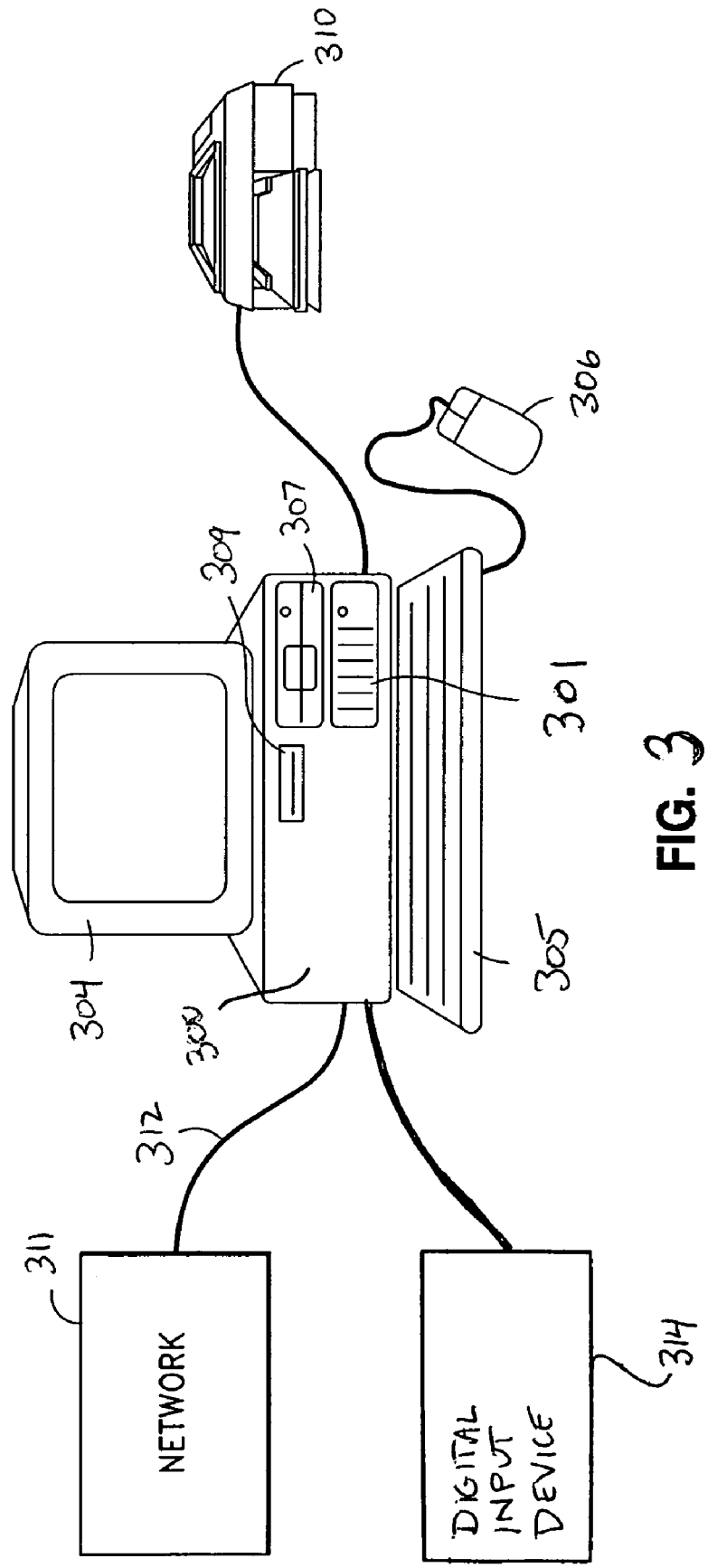
FIG. 3 depicts the exterior appearance of one embodiment of a system housing the present invention.

FIG. 3 depicts the exterior appearance of one embodiment of a system housing the present invention. Computer system 300 includes computer-readable storage medium, such as fixed disk drive 301, in which is stored a program for compressing and/or reconstructing image data. As shown in FIG. 3, the hardware environment can include computer system 300, display monitor 304 for displaying text and images to a user, keyboard 305 for entering text data and user commands into computer system 300, mouse 306 for pointing, selecting and manipulating objects displayed on display monitor 304, fixed disk drive 301, removable disk drive 307, tape drive 309, hardcopy output device 310, computer network 311, computer network connection 312, and digital input device 314.

Display monitor 304 displays the graphics, images, and text that comprise the user interface for the software applications used by the present invention, as well as the operating system programs necessary to operate computer system 300. A user of computer system 300 uses keyboard 305 to enter commands and data to operate and control the computer operating system programs as well as the application programs. The user uses mouse 306 to select and manipulate graphics and text objects displayed on display monitor 304 as part of the interaction with and control of computer system 300 and applications running on computer system 300. Mouse 306 is any type of pointing device, including a joystick, a trackball, or a touch-pad without departing from the scope of the present invention. Furthermore, digital input device 314 allows computer system 300 to capture digital images, and is a scanner, digital camera or digital video camera.

The enhanced image compression mechanism application programs are stored locally on computer readable memory media, such as fixed disk drive 301. In a further arrangement, fixed disk drive 301 itself comprises a number of physical drive units, such as a redundant array of independent disks ("RAID"). In an additional arrangement, fixed disk drive 301 is a disk drive farm or a disk array that is physically located in a separate computing unit. Such computer readable memory media allow computer system 300 to access image data, image compression application data, computer-executable process steps, application programs and the like, stored on removable and non-removable memory media.

Network interface 312 is a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. Network 311 is a LAN network, however in further arrangements of the present invention network 311 is a corporate or government WAN network, or the Internet.

Removable disk drive 307 is a removable storage device that is used to off-load data from computer system 300 or upload data onto computer system 300. Removable disk drive 307 is a floppy disk drive, an IOMEGA® ZIP® drive, a compact disk-read only memory ("CD-ROM") drive, a CD-Recordable drive ("CD-R"), a CD-Rewritable drive ("CD-RW"), a DVD-ROM drive, flash memory, a Universal Serial Bus ("USB") flash drive, pen drive, key drive, or any one of the various recordable or rewritable digital versatile disk ("DVD") drives such as the DVD-Recordable ("DVD-R" or "DVD+R"), DVD-Rewritable ("DVD-RW" or "DVD+RW"), or DVD-RAM. Operating system programs, applications, and various data files, such as image data files or image compression application programs, are stored on disks. The files are stored on fixed disk drive 301 or on removable media for removable disk drive 307 without departing from the scope of the present invention.

Tape drive 309 is a tape storage device that is used to off-load data from computer system 300 or upload data onto computer system 300. Tape drive 309 is a quarter-inch cartridge ("QIC"), 4 mm digital audio tape ("DAT"), or 8 mm digital linear tape ("DLT") drive.

Hardcopy output device 310 provides an output function for the operating system programs and applications including the enhanced image compression mechanism. Hardcopy output device 310 is a printer or any output device that produces tangible output objects, including image data or graphical representations of image data. While hardcopy output device 310 is preferably directly connected to computer system 300, it need not be. For instance, in an alternate arrangement of the invention, hardcopy output device 310 is connected via a network interface (e.g., wired or wireless network, not shown).

Although computer system 300 is illustrated in FIG. 3 as a desktop PC, in further arrangements of the present invention computer system 300 is a laptop, a workstation, a midrange computer, a mainframe, or an embedded system.

Figure 4:
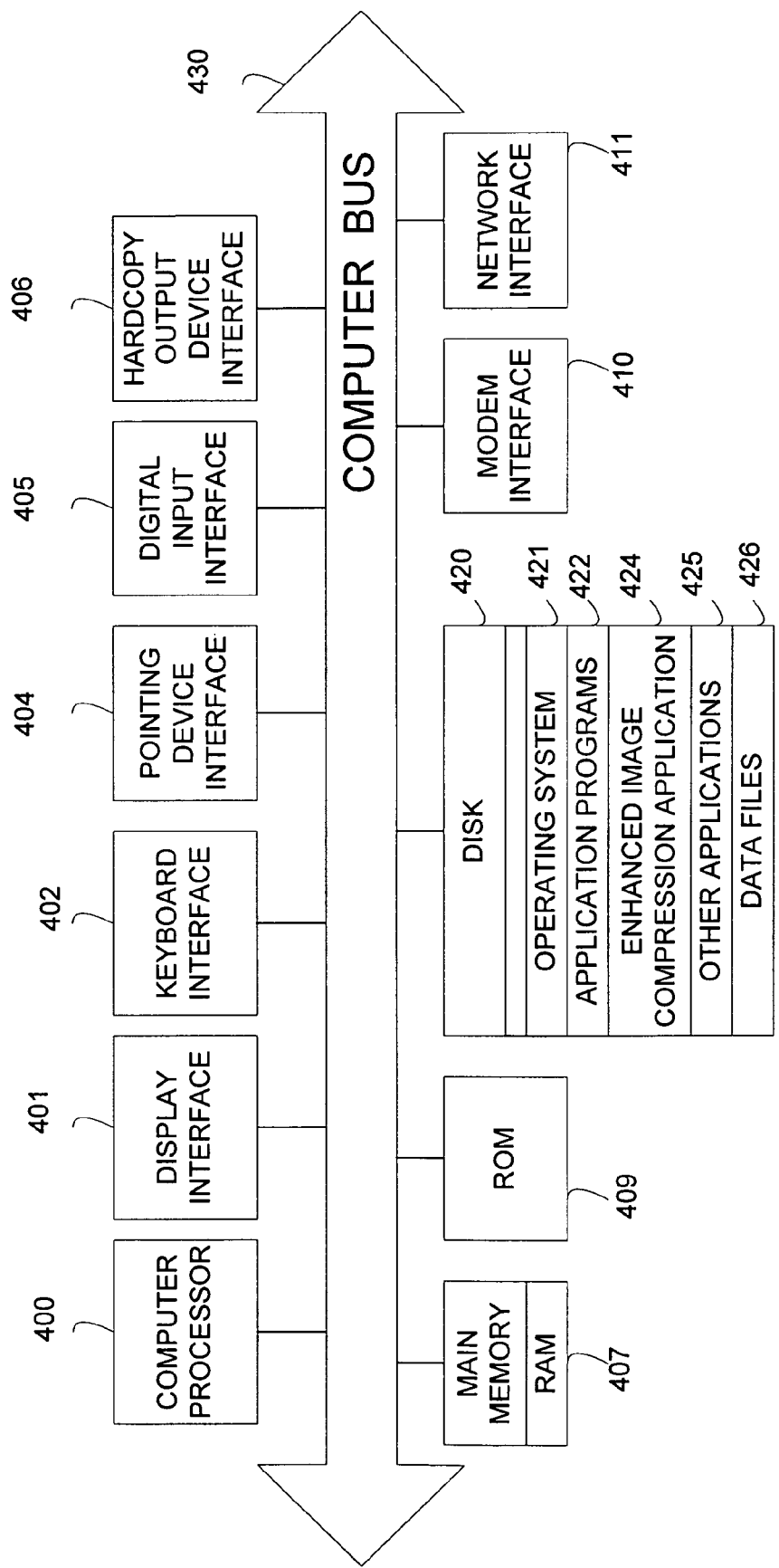
FIG. 4 depicts an example of an internal architecture of the FIG. 3 embodiment.

FIG. 4 depicts an example of an internal architecture of the FIG. 3 embodiment. The computing environment includes computer processor 400 where the computer instructions that comprise an operating system or an application, including the improved image compression mechanism, are processed; display interface 401 which provides a communication interface and processing functions for rendering graphics, images, and texts on display monitor 304; keyboard interface 402 which provides a communication interface to keyboard 305; pointing device interface 404 which provides a communication interface to mouse 306 or an equivalent pointing device; digital input interface 405 which provides a communication interface to digital input device 314; hardcopy output device interface 406 which provides a communication interface to hardcopy output device 310; random access memory ("RAM") 407 where computer instructions and data are stored in a volatile memory device for processing by computer processor 400; read-only memory ("ROM") 409 where invariant low-level systems code or data for basic system functions such as basic input and output ("I/O"), startup, or reception of keystrokes from keyboard 305 are stored in a non-volatile memory device; disk 420 which can comprise fixed disk drive 301 and removable disk drive 307, where the files that comprise operating system 421, application programs 422 (including enhanced image compression application 424 and other applications 425) and data files 426 are stored; modem interface 410 which provides a communication interface to computer network 311 over a modem; and computer network interface 411 which provides a communication interface to computer network 311 over a computer network connection 312. The constituent devices and computer processor 400 communicate with each other over computer bus 430.

RAM 407 interfaces with computer bus 430 so as to provide quick RAM storage to computer processor 400 during the execution of software programs such as the operating system application programs, and device drivers. More specifically, computer processor 400 loads computer-executable process steps from fixed disk drive 301 or other memory media into a field of RAM 407 in order to execute software programs. Data, including data relating to the image compression, is stored in RAM 407, where the data is accessed by computer processor 400 during execution.

Also shown in FIG. 4, disk 420 stores computer-executable code for a windowing operating system 421, application programs 422 such as word processing, spreadsheet, presentation, graphics, image processing, gaming, or other applications. Disk 420 also stores the enhanced image compression application 424 which utilizes Hilbert curve scanning of quantized DCT coefficients to compress image data or reconstruct compressed image data.

Figures 5A, 5B:
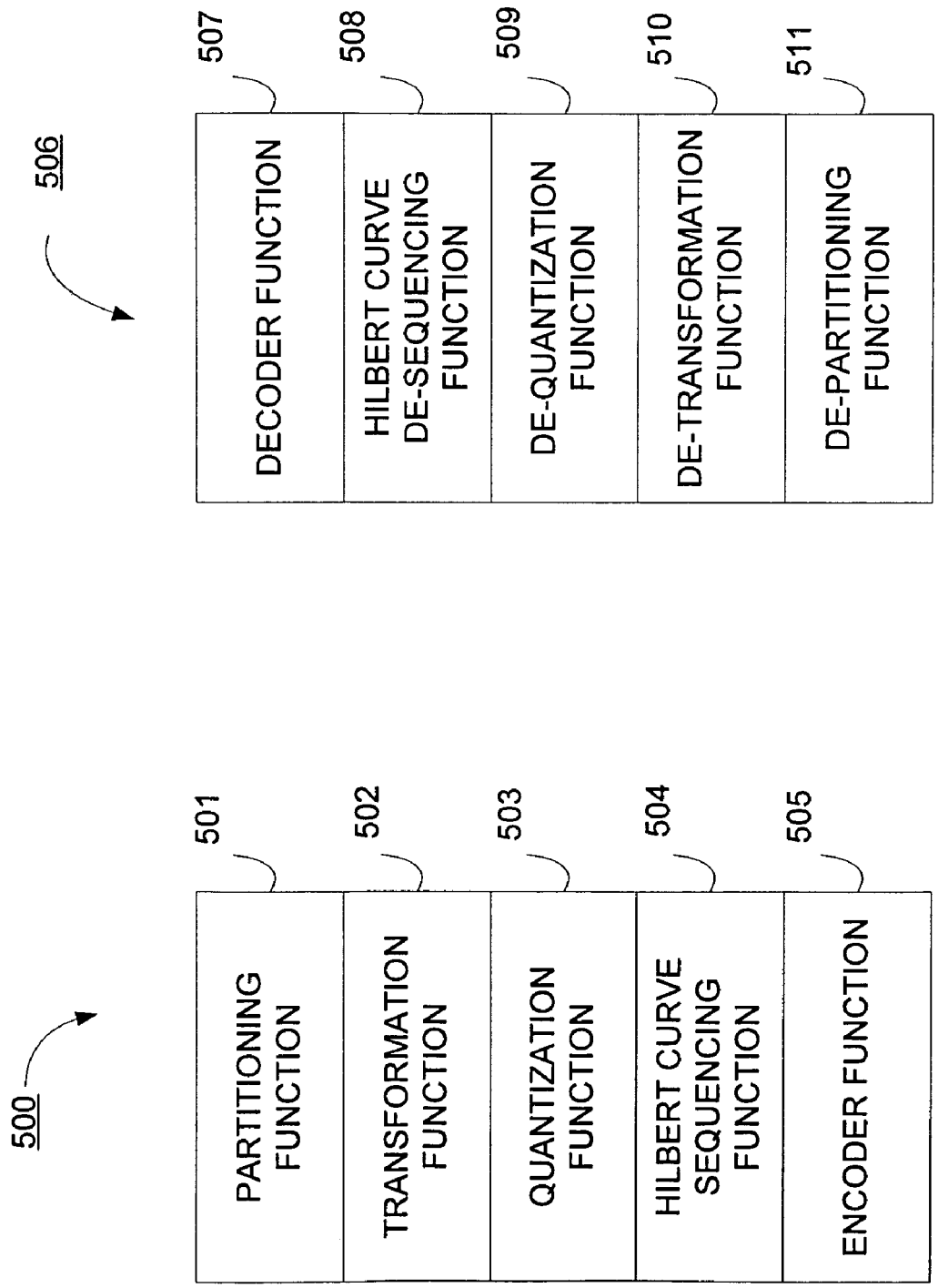
FIGS. 5A and 5B depict block diagrams of the routines that implement the method of the present invention.

Referring ahead briefly to FIG. 5A, enhanced image compression application 424 includes compression routine 500, where compression routine 500 further includes partitioning function 501, transformation function 502, quantization function 503, Hilbert curve sequencing function 504, and encoder function 505. As shown in FIG. 5B, enhanced image compression application 424 further includes reconstruction routine 506, where reconstruction routine 506 further includes decoder function 507, Hilbert curve de-sequencing function 508, de-quantization function 509, de-transformation function 510, and de-partitioning function 511. As will be described in detail below, the present invention enables computer system 300, under the direction of compression routine 500 and reconstruction routine 506 to compress and reconstruct images, respectively, while preserving coefficient adjacency.

The compression of images using Hilbert curve scanning of quantized DCT coefficients is preferably implemented as shown, however it is also possible to implement the image compression mechanism according to the present invention as a dynamic link library ("DLL"), or as a plug-in to other application programs such as an Internet web-browser such as the MICROSOFT® Internet Explorer web browser.

Computer processor 400 is one of a number of high-performance computer processors, including an INTEL® or AMD® processor, a POWERPC® processor, a MIPS® reduced instruction set computer ("RISC") processor, a SPARC® processor, a HP ALPHASERVER® processor or a proprietary computer processor for a mainframe, without departing from the scope of the present invention. In an additional arrangement, computer processor 400 in computer system 300 is more than one processing unit, including a multiple CPU configuration found in high-performance workstations and servers, or a multiple scalable processing unit found in mainframes.

Operating system 421 is: MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; or a proprietary operating system for mainframe computers.

While FIGS. 3 and 4 illustrate a preferred embodiment of a computing system that executes program code, or program or process steps, configured to compress images using Hilbert curve scanning of quantized DCT coefficients, other types of computing systems may also be used as well.

Figure 6:
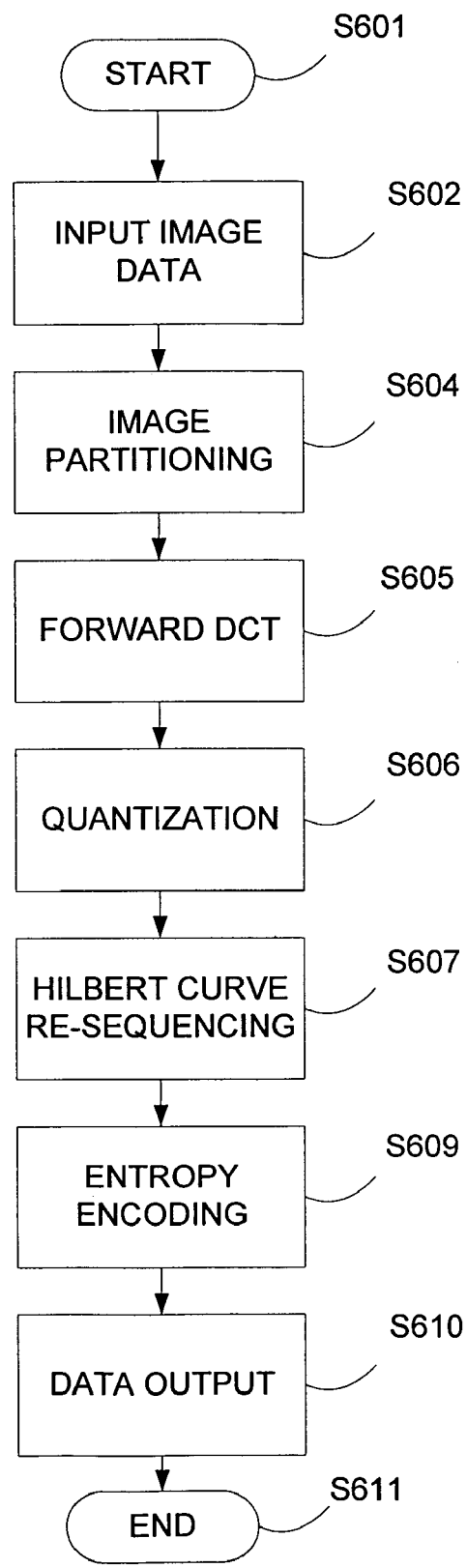
FIG. 6 is a flow diagram depicting an example of an improved process for compressing an image using Hilbert curve scanning of quantized DCT coefficients, according to the present invention.

FIG. 6 is a flow diagram depicting the improved process for compressing an image using Hilbert curve scanning of quantized DCT coefficients, according to the present invention. Briefly, the method includes the steps partitioning image information for the image into partitioned information, transforming the partitioned information into transformed information using a discrete cosine transform, and quantizing the transformed information into quantized information. The method further includes the steps of sequencing the quantized information into sequenced information using a Hilbert curve scan, encoding the sequenced information into encoded information, and storing the encoded information.

In more detail, the compression process begins (Step S601), and image information or data for the image is input (Step S602). For example, the obtained image is a scanned raster image, a photograph from a digital camera, or a satellite image, such as SPACE IMAGING®'s IKONOS®, CNES/France's SPOT and the United States' LANDSAT®. The image is obtained and designated in a variety of ways, such as a user-initiated download, or upon the selection of an image feed, or by an automated periodic image capture.

Color image information includes a plurality of numerical value sets representing an obtained color image in one of a plurality of normal color space signal formats. A normal color space signal format is a set of numerical values which characterizes an image's colors in a particular color system using spectral weighting functions. If such a conversion is necessary, a fixed color space transformation is employed to transform the color image information from a red-green-blue color space ("RGB color space"), a cyan-magenta-yellow color space ("CMY color space"), or a cyan-magenta-yellow-black color space ("CMYK color space") into a luminance/chrominance color space (the "YUV color space," and related "YCC" or "YCbCr" color spaces), where luminance is the first component ("Y") and chrominance the second component ("U" or "Cb" chroma channel, or U-axis) and third component ("V" or "Cr" chroma channel, or V-axis).

In the RGB, CMY, or CMYK color space signal formats, a set of three numerical values (if RGB or CMY) or four numerical values (if CMYK) of the plurality of numerical value sets is associated with each pixel in the array of pixels for the obtained color image. In particular, this set of values in the normal color space signal format is expressed as a color triple or quadruple, such as (0,0,0) in the RGB color space, where each numerical value in the set corresponds to a color component used by the color system, and where the color components are used in combination by the particular color system to represent colors. For example, the set of three numerical values or color triple $0_R, 0_G, 0_B$ represents the color black, where the numerical values correspond respectively to the red, green, and blue components for generating the color black in the RGB color space. By varying the numerical values in a set of values in the color triple or quadruple, the representative color of the associated pixel varies. The plurality of numerical value sets enables the display of images for viewing on display monitor 304, as well as the compression and reconstruction of an image.

The rationale for using the luminance/chrominance color space in the conventional JPEG image compression mechanism is that some chrominance information can be lost in an image, since the human eye is less likely to perceive the changes in the chrominance or color component of a reconstructed image. As a result, the chrominance components are sub-sampled or reduced, while the luminance component is left at full resolution. In the YUV color space, input color information is represented by three arrays of unsigned bytes, where each unsigned byte has a value between 0 and 255. The input of image information and the conversion of color image information between color spaces are well known in the art.

In an additional arrangement, the present invention further converts input color information into intrinsic or other color information using a principal components or Karhunen-Loeve ("KL") transform. The KL transform is a mathematical way of determining that linear transformation of a sample of points in N-dimensional space which exhibits the properties of the sample most clearly along the coordinate axes. Along the new axes, the sample variances are extremes (maxima and minima), and are uncorrelated. The name "principal component transform" comes from the principal axes of an ellipsoid (e.g. the ellipsoid of inertia), which are just the coordinate axes in question. KL transformation of input color information results in an increased overall image compression ratio.

The image information is partitioned into partitioned information (Step S604). Specifically, instructed by enhanced image compression application 424 (and corresponding partitioning function 501), computer processor divides the input image information into blocks of N×N pixels, where each block is transformed and coded independently. By dividing an image into blocks, the image compression mechanism allows for variable quantization, exploiting variations in frequency content across an image, since images contain regions with different frequency properties. According to simulation results, for natural images, N is optimal between 8 and 16; the JPEG standard selects N=8. The image is partitioned into blocks from left to right, top to bottom.

The choice of block sizes is an important decision, since the selection of too large of a block can include more than one region with different frequency properties, while the selection of too small of a block results in less efficient image compression. In a further arrangement, the present invention uses variable block size partitioning, where the size of the block varies across the image. The partitioning of color information into blocks of N×N pixels is well known in the art.

In Step S605, a forward DCT is applied to the partitioned information, generating transformed information (in the form of DCT coefficient vectors). In particular, computer processor 400, under the instruction of enhanced image compression application 424, performs an approximation of the values in the plurality of intrinsic value sets in response to receiving the partitioned information generated in Step S604. Each partitioned block from the input image is input to the forward DCT in a raster scan sequence, from left to right, and from top to bottom. In an additional arrangement, enhanced image compression application 424 applies trigonometric functions to the partitioned information, in accordance with the JPEG DCT compression standard, to generate a plurality of approximation values as transformed information.

The JPEG DCT is a relative of the DFT, and likewise gives a frequency map, where the DCT itself is reversible except for round-off error. The motivation for generating a frequency maps is that high-frequency information can be disposed of without impacting low-frequency information. The techniques and methods for implementing a forward DCT are well known in the art.

Figure 7:
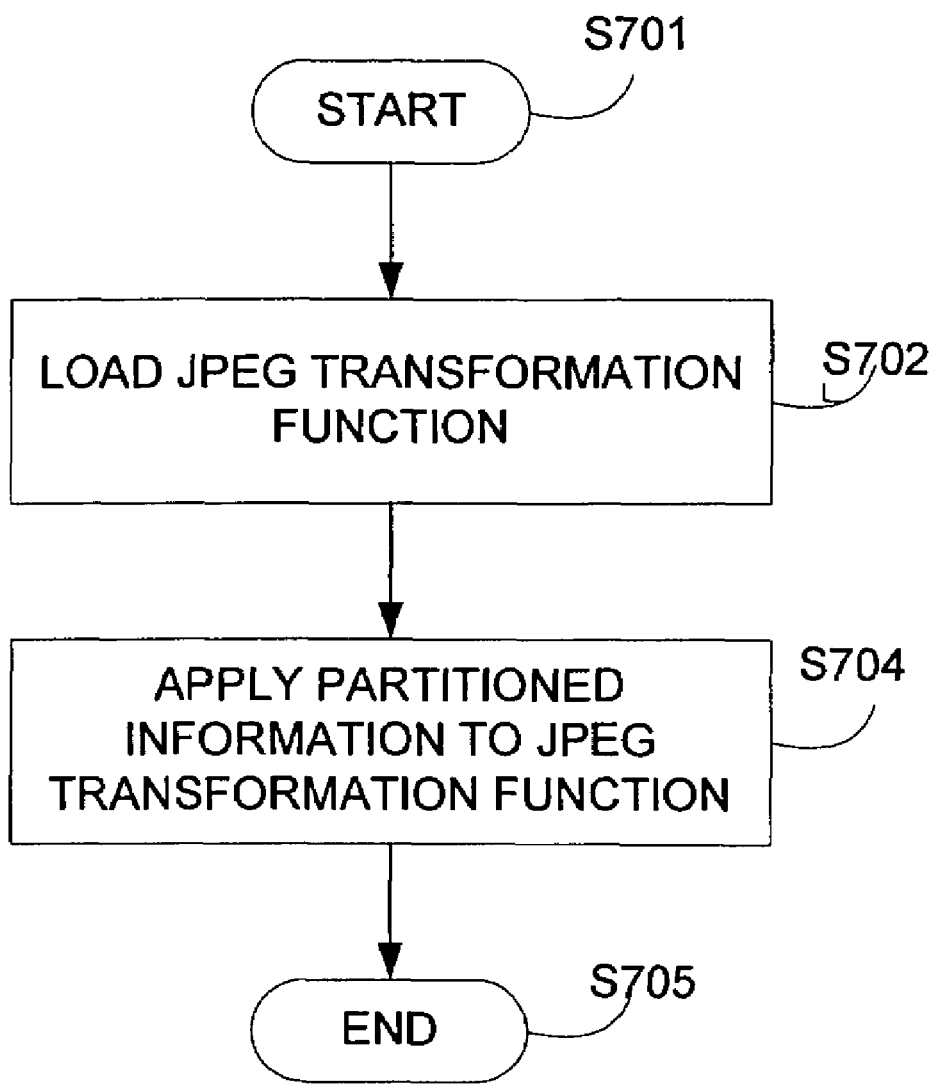
FIG. 7 is a flow diagram of the transformation function for JPEG DCT encoding.

FIG. 7 is a flow diagram of the transformation function for JPEG images according to one embodiment of the present invention, further illustrating the process for transforming partitioned information into transformed information using a JPEG DCT algorithm. The process begins (Step S701), and JPEG transformation function 502 is loaded from a data storage medium such as fixed disk drive 301 into RAM 407 (Step S702). The portioned information is applied to JPEG transformation function 502 (Step S704), and JPEG transformation function 502 converts the intrinsic color data to transformed information, and the process ends (Step S705). JPEG transformation function 502 itself performs no data compression.

The one-dimensional DCT X[k] of a sequence x[n] is expressed below in Equation (1):

$$X[k] = a_k \sum_{n=0}^{N-1} x[n] \cos\left(\frac{\pi(2n+1)k}{2N}\right) \quad k = 0, 1, \ldots, N-1 \quad (1)$$

where $a_0$ and $a_k$ are expressed in Equation (2):

$$a_0 = \sqrt{\frac{1}{N}} \quad a_k = \sqrt{\frac{2}{N}} \quad k = 1, \ldots, N-1 \quad (2)$$

Each block of 8×8 values can be visualized as a two-dimensional discrete spatial signal. The forward DCT is effectively a two-dimensional spectral analyzer that converts the image signal into a unique 8×8 spatial frequency plane. The DCT coefficient values can be regarded as the relative amount of the two-dimensional spatial frequencies contained in the 64-point input signal. Since sample values of typical continuous tone images vary slowly from pixel to pixel across an image, most of the signal energy as represented by coefficient amplitude is concentrated in the lower spatial frequencies region, or the upper left corner. As such, most of the higher frequency coefficients which have zero or near zero amplitude can be left un-encoded while retaining most of the image information.

Returning to FIG. 6, under the instruction of quantization function 503, computer processor 400 performs the quantization process in response to receiving the transformed information generated in Step 502 (Step S606). The quantization process reduces or truncates the DCT coefficients to a predetermined range of integer values, thus reducing the number of bits that are required to represent the approximation values.

Quantization is performed by dividing each approximation value by a predetermined value, where the predetermined value is obtained from an entry in a quantization table. JPEG, for example, defines a standard quantization table for the chrominance channel, and a standard quantization table for the luminance channels. Since the human eye is most sensitive to low frequencies (the upper left corner of a quantization table) and less sensitive to high frequencies (the lower right corner) customized quantization tables can be scaled up or down to adjust the quality factor. Furthermore, one having ordinary skill in the art may vary the entries in a quantization table to optimize image compression of different types of images.

Following quantization, the quantized information (representing quantized DCT coefficients) is sequenced into sequenced information using a Hilbert curve scan (Step S607). Specifically, computer processor 400, under the instruction of Hilbert curve sequencing function 504, performs a sequencing process in response to receiving a plurality of quantized DCT coefficients. Hilbert curve sequencing function 504 groups low-frequency coefficients at the top of a vector, mapping the 8×8 vector to a 1×64 vector (or mapping a N×N vector to a 1×N$^2$ vector, as the case may be), by winding through the quantized DCT coefficients using a Hilbert curve scan, preserving coefficient adjacency and reducing jump discontinuities. Hilbert curve sequencing function 504 starts with the low-frequency quantized DCT coefficients at the top left of the vector, and travels to the high-frequency quantized DCT coefficients along a Hilbert curve path.

A Hilbert curve is a Lindenmayer system invented by David Hilbert (1862-1943), whose limit is a plane-filling curve which fills a square. Traversing the polyhedron vertices of an n-dimensional hypercube in Gray code order produces a generator for the n-dimensional Hilbert curve. FIGS. 8A to 8E depict Hilbert curves for a 2×2 vector, a 4×4 vector, a 8×8 vector, a 16×16 vector, and a 32×32 vector, respectively. These illustrated Hilbert curves, as well as Hilbert curves for vectors larger than 32×32, are known in the art.

Figure 1:
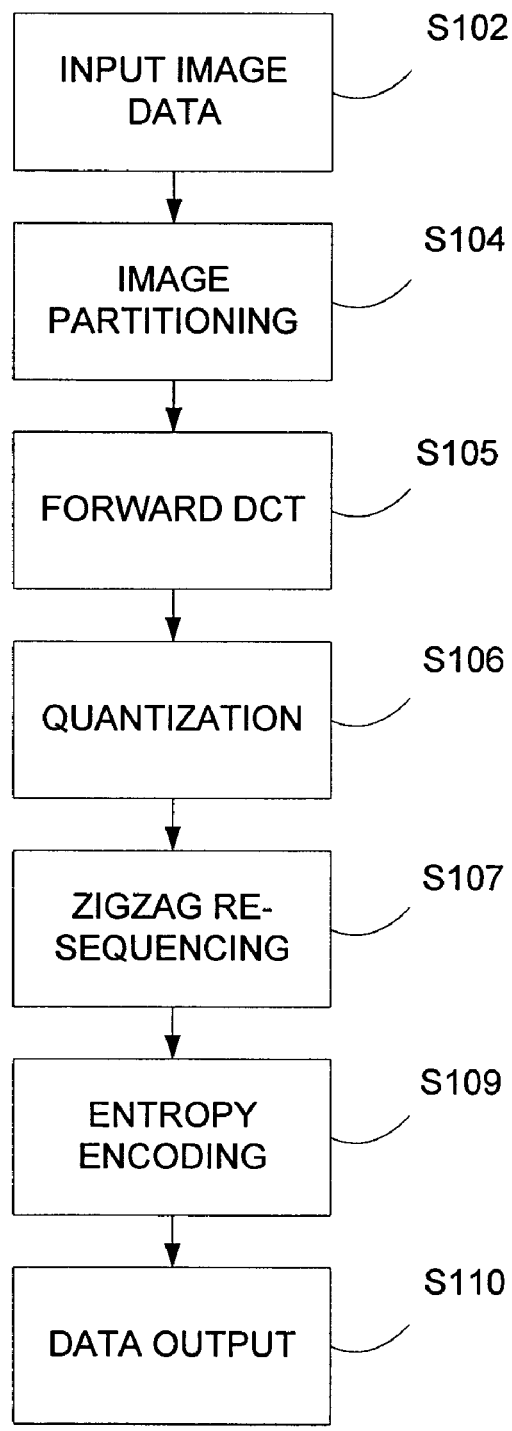
FIG. 1 is a block diagram illustrating the baseline algorithm utilized by the conventional JPEG coding standard.
Figures 2A, 2B, 2C:
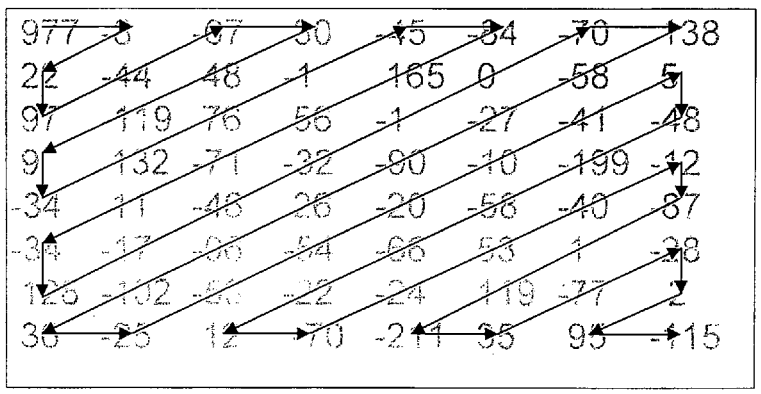
FIGS. 2A to 2C depict some of the problems associated with the conventional JPEG image compression mechanism, specifically illustrating the inefficiencies related to zigzag re-sequencing of quantized DCT coefficients.
Figure 8E:
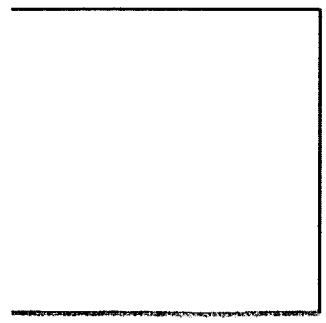
FIGS. 8A to 8E depict several example Hilbert curves.
Figure 8D:
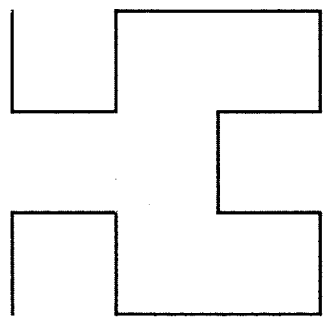
Figure 8C:
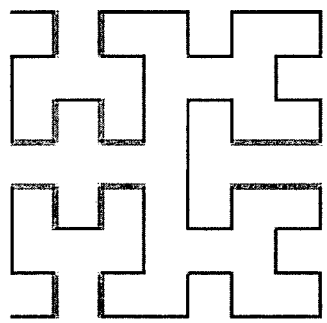
Figure 8B:
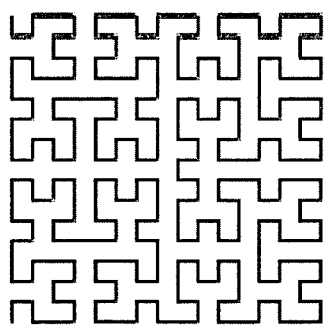
Figure 8A:
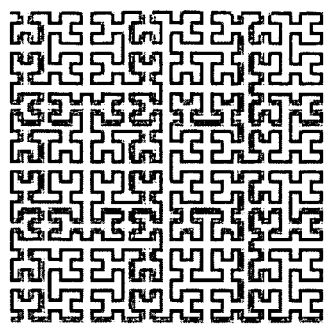
Figures 9A, 9B:
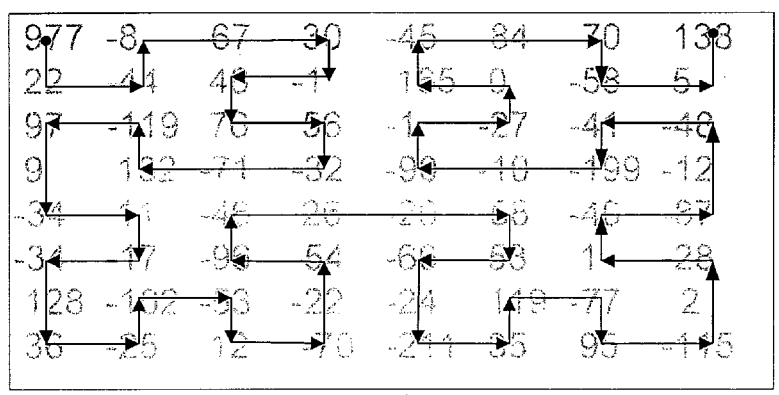
FIGS. 9A and 9B illustrate the sequencing of quantized DCT coefficients using Hilbert curve scanning.

Utilizing the 8×8 Hilbert curve illustrated in FIG. 8C, FIG. 9A depicts the enhanced sequencing process on the same example 8×8 vector shown in FIG. 2A. FIG. 9B depicts the 1×64 vector, resulting from Hilbert curve sequencing the FIG. 2A vector, showing that pixel adjacencies are preserved, and jump discontinuities have been minimized, compared to the zigzag sequencing approach utilized by conventional JPEG.

Software such as MATLAB® can be used to compress quantized DCT coefficients and store them in TIFF files using "packbits" compression. The resulting file size of the random 8×8 image patch depicted in FIG. 2A, sequenced using the conventional zigzag sequencing method (depicted in FIG. 2B) is 258 bytes. The resulting file size of the same image patch, sequenced using the novel Hilbert curve sequencing method according to the present invention (depicted in FIG. 9A) is 250 bytes. As such, in this one example, the image compression mechanism according to the present invention has a 3% compression increase over conventional image compression mechanisms. For other image types, Hilbert curve scanning of quantized DCT coefficients has an even greater beneficial effect.

Computer processor 400, under the instruction of encoder function 505, performs the encoding process in response to receiving the sequenced information, encoding the sequenced information into encoded information (Step S609). The encoding process reduces the number of bits that are used to represent the quantized approximation values. The reduction is accomplished using Huffman coding or arithmetic coding, although in alternate arrangements other encoding techniques are used. The coding replaces subsets of bit information corresponding to quantized approximation values with bit information that more efficiently represents the subsets of bit information.

The encoding process generates a reduced stream of bits which compactly represents the quantized approximation values in a non-redundant manner. The reduced bit stream generated by the encoding process corresponds to a compressed representation of the image. The encoding step achieves additional lossless compression by encoding the quantized DCT coefficients more compactly based on their statistical characteristics. These and other techniques and methods for encoding information are well known in the art.

In Step S610, the reduced bit stream corresponding to the image is stored as a file, and the process ends (Step S611). In one embodiment, the file is stored in RAM 407 of computer system 300. In an alternate embodiment, the file is transmitted to a remote computer at remote location using network interface 312. A user may access the file from RAM 407 at a future time for transmission and decompression. The resultant file has dramatic size and image quality improvements over conventional image compression mechanisms.

Figure 10:
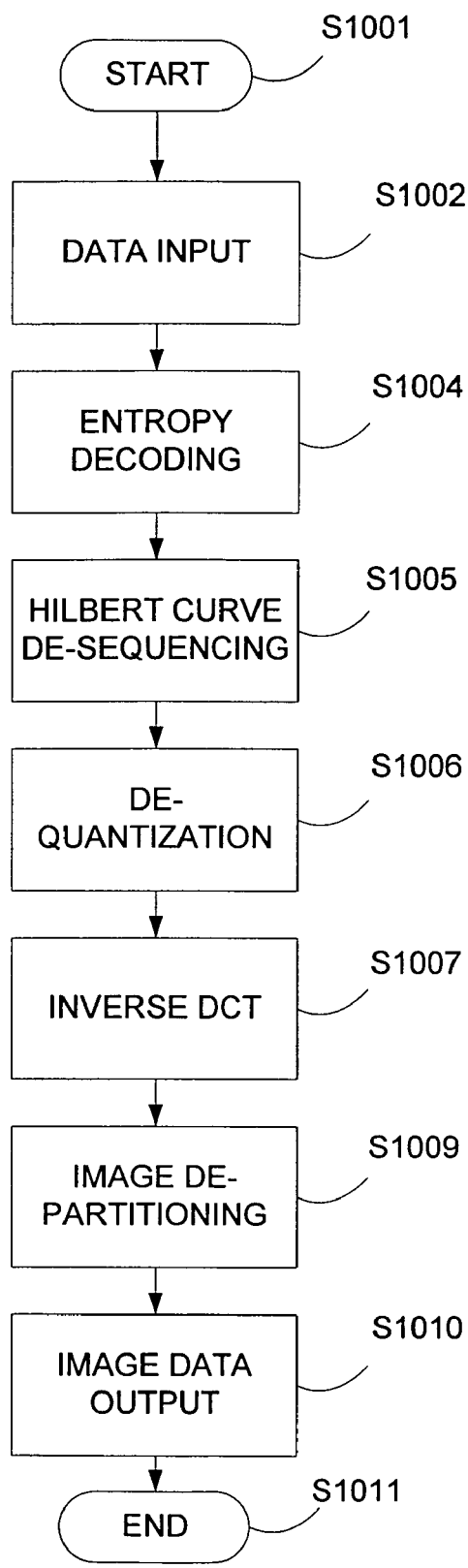
FIG. 10 is a flow chart depicting an improved process for reconstructing an image, in accordance with the present invention.

Image data which has been compressed utilizing the image compression mechanism according to the present invention, can be readily reconstructed. FIG. 10 is a flow chart depicting an improved process for reconstructing an image, in accordance with the present invention. Briefly, the method includes the steps of decoding encoded information for the image into sequenced information, and de-sequencing the sequenced information into quantized information using a Hilbert curve scan. The method for reconstructing an image further includes the steps of de-quantizing the quantized information into transformed information, de-transforming the transformed information into partitioned information using an inverse of a discrete cosine transform, and de-partitioning the partitioned information into image information. The reconstruction process is performed on computer system 300, using enhanced image compression application 424.

In more detail, the reconstruction process begins (Step S1001), and in Step S1002 a data is received including reduced image information, or encoded information, corresponding to an image, compressed using the technique described above and illustrated in FIGS. 3 to 9.

In Step S1004, computer processor 400, under the instruction of decoder function 507, performs an inverse encoding process, decoding the encoded information into sequenced information. The inverse encoding process replaces the reduced image information, which is a stream of bits that compactly represents the image in a non-redundant manner, with a bit stream that originally represented the image. More specifically, the bit stream that originally represented the sequenced, quantized approximation values is generated. The techniques and methods for decoding information are well known in the art.

In Step S1005, computer processor 400, under the instruction of Hilbert curve de-sequencing function 508, re-sequences the decoded information from a 1×$N^2$ vector to an N×N vector of quantized DCT coefficients, using a Hilbert curve scan, outputting quantized information. The Hilbert curve scan path used in Step S1005 is opposite the Hilbert curve scan path used in Step S607.

In Step S1006, computer processor 400, under the instruction of de-quantization function 509, performs an inverse quantization process, de-quantizing the quantized information into transformed information. The dequantization process returns the plurality of quantized approximation values to there near original range of approximation values. As in the quantization Step S606, the process is achieved using a quantization table, such as the JPEG standard quantization tables.

In Step S1007, computer processor 400, under the instruction of de-transformation function 510, performs an inverse of a discrete cosine transform, de-transforming the transformed information into partitioned information. According to one arrangement, de-transformation function 510 applies the inverse of the JPEG DCT to generate the plurality of value sets that are substantially similar to the original plurality of input image information value sets. The techniques and methods for implementing an inverse of a DCT, including an inverse of a JPEG DCT, are well known in the art.

The inverse of the JPEG DCT is expressed in Equation (3), below:

$$x[n] = a_k \sum_{k=0}^{N-1} X[k] \cos\left(\frac{\pi(2n+1)k}{2N}\right) n = 0, 1, \ldots, N-1 \qquad (3)$$

In Step S1009, computer processor 400, under the instruction of de-partitioning function 511, de-partitions the partitioned information into image information. In Step S1010, the image information is output, and image information corresponding to the numerical values sets are transmitted to display interface 401 for display on display monitor 304. In Step S1011, the process ends.

The present invention has been described above with reference to the accompanying drawings that show preferred embodiments of the invention. The present invention, however, may be embodied in many different forms and should not be construed as limited to the embodiments set forth herein. Appropriately, these embodiments are provided so that this disclosure will be thorough and complete, and will fully convey the scope of the invention. As will be appreciated by one having skill in the art, the present invention may be embodied as a method, data processing system, or computer program product.

Although specific embodiments of the present invention have been described, it will be understood by those skilled in the art that there are other embodiments that are equivalent to the described embodiments. Accordingly it is to be understood that the invention is not to be limited by the specific illustrated embodiments, but only by the scope of the appended claims.

What is claimed is:

1. A computer-readable storage medium in which is stored a program for compressing an image, said program comprising codes for permitting the computer to perform:
   a conversion step for converting color information included in image information for the image into converted color information using a principal components transform;
   a partitioning step for partitioning the image information for the image into partitioned information;
   a transforming step for transforming the partitioned information into transformed information using a discrete cosine transform;
   a quantizing step for quantizing the transformed information into quantized information;
   a sequencing step for sequencing the quantized information into sequenced information using a Hilbert curve scan;
   an encoding step for encoding the sequenced information into encoded information; and
   a storing step for storing the encoded information.

2. The computer-readable storage medium according to claim 1, wherein the discrete cosine transform is a JPEG discrete cosine transform.

3. A method for compressing and reconstructing an image, comprising the steps of:
   converting color information included in image information for the image into converted color information using a principal components transform;
   partitioning the image information for the image into partitioned information;
   transforming the partitioned information into transformed information using a discrete cosine transform;
   quantizing the transformed information into quantized information;
   sequencing the quantized information into sequenced information using a Hilbert curve scan;
   encoding the sequenced information into encoded information;
   storing the encoded information; and
   reconstructing the encoded information.

4. The method for compressing and reconstructing an image according to claim 3, wherein the discrete cosine transform is a JPEG discrete cosine transform.

5. A method for reconstructing an image, comprising the steps of:
   decoding encoded information for the image into sequenced information;
   de-sequencing the sequenced information into quantized information using a Hilbert curve scan;
   de-quantizing the quantized information into transformed information;
   de-transforming the transformed information into partitioned information using an inverse of a discrete cosine transform;
   de-partitioning the partitioned information into image information that includes converted color information; and
   obtaining color information from the converted color information using an inverse of a principal components transform.

6. The method for reconstructing an image according to claim 5, wherein the discrete cosine transform is a JPEG discrete cosine transform.

7. A system for reconstructing an image, comprising:
   a memory that includes stored encoded image information; and
   a computer processor for reconstructing the image from the stored encoded image information, by performing the stops of:
      decoding the encoded image information into sequenced information;
      de-sequencing the sequenced information into quantized information using a Hilbert curve scan;
      de-quantizing the quantized information into transformed information;
      de-transforming the transformed information into partitioned information using an inverse of a discrete cosine transform;
      de-partitioning the partitioned information into image information that includes converted color information; and
   obtaining color information from the converted color information using an inverse of a principal components transform.

8. The system for reconstructing an image according to claim 7, wherein the discrete cosine transform is a JPEG discrete cosine transform.

9. A computer-readable storage medium in which is stored a program for reconstructing an image, said program comprising codes for permitting the computer to perform:
   a decoding step for decoding encoded information for the image into sequenced information;
   a de-sequencing step for de-sequencing the sequenced information into quantized information using a Hilbert curve scan;
   a de-quantization step for de-quantizing the quantized information into transformed information;
   a de-transformation step for de-transforming the transformed information into image information using an inverse of a discrete cosine transform;
   a de-partitioning step for de-partitioning the partitioned information into image information that includes converted color information; and
   a de-conversion step for de-converting the converted color information into de-converted color information using a principal components transform.

10. The computer-readable storage medium according to claim 9, wherein the discrete cosine transform is a JPEG discrete cosine transform.

11. A method for compressing an image, comprising the steps of:
   converting color information included in image information for the image into converted color information using a principal components transform;
   partitioning the image information into partitioned information;
   transforming the partitioned information into transformed information using a discrete cosine transform;
   quantizing the transformed information into quantized information;
   sequencing the quantized information into sequenced information using a Hilbert curve scan; and
   encoding the sequenced information into encoded information.

12. The method for compressing an image according to claim 11, wherein the discrete cosine transform is a JPEG discrete cosine transform.

13. A system for compressing an image, comprising:
   a memory that includes stored image information for the image; and
   a computer processor for compressing the stored image information, by performing the steps of:

converting color information included in the stored image information for the image into converted color information using a principal components transform;

partitioning the stored image information for the image into partitioned information, transforming the partitioned information into transformed information using a discrete cosine transform, quantizing the transformed information into quantized information, sequencing the quantized information into sequenced information using a Hilbert curve scan, and encoding the sequenced information into encoded information.

14. The system for compressing an image according to claim 13, wherein the discrete cosine transform is a JPEG discrete cosine transform.

* * * * *